United States Patent
Turull et al.

(10) Patent No.: US 11,023,283 B2
(45) Date of Patent: Jun. 1, 2021

(54) METHOD AND RESOURCE MANAGER FOR SCHEDULING OF INSTANCES IN A DATA CENTRE

(71) Applicant: Telefonaktiebolaget LM Ericsson (publ), Stockholm (SE)

(72) Inventors: Daniel Turull, Solna (SE); Raquel Vigolvino Lopes, Campina Grande (BR); Marcus Carvalho, Campina Grande (BR); Francisco Vilar Brasileiro, Campina Grande (BR); Giovanni Farias Da Silva, Campina Grande (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/604,924

(22) PCT Filed: Apr. 13, 2017

(86) PCT No.: PCT/SE2017/050375
§ 371 (c)(1),
(2) Date: Oct. 11, 2019

(87) PCT Pub. No.: WO2018/190758
PCT Pub. Date: Oct. 18, 2018

(65) Prior Publication Data
US 2020/0073724 A1 Mar. 5, 2020

(51) Int. Cl.
*G06F 9/50* (2006.01)
*G06F 9/455* (2018.01)
*H04L 29/08* (2006.01)

(52) U.S. Cl.
CPC ........ *G06F 9/5077* (2013.01); *G06F 9/45558* (2013.01); *G06F 9/5027* (2013.01);
(Continued)

(58) Field of Classification Search
CPC .. G06F 9/45558; G06F 9/4806; G06F 9/4843; G06F 9/485; G06F 9/4881;
(Continued)

(56) References Cited

U.S. PATENT DOCUMENTS 7,725,571 B1 * 5/2010 Lewis ................. H04L 41/5009
709/224
7,752,622 B1 * 7/2010 Markov ................. G06F 9/4881
718/103

(Continued)

FOREIGN PATENT DOCUMENTS

WO 2012112097 A1 8/2012
WO 2016190793 A1 12/2016

OTHER PUBLICATIONS

Carvalho, Marcus, Daniel A. Menascé, and Francisco Brasileiro. "Capacity planning for IaaS cloud providers offering multiple service classes." Future Generation Computer Systems 77 (2017): 97-111. (Year: 2017).*

(Continued)

*Primary Examiner* — Vivek Srivastava
*Assistant Examiner* — William C McBeth
(74) *Attorney, Agent, or Firm* — NDWE LLP

(57) ABSTRACT

A method, a resource manager, and a computer program are described for scheduling instances in a logical server, where each instance belongs to a class of instances, where each class is associated with a required service level objective (SLO). Based on determined margins between current SLOs and required SLOs, instances are sorted. If resources are not enough, an instance having a large margin may be pre-empted irrespective of the class. If available resources are sufficient for an instance having a small margin, this instance can be allocated resources. If the available resources do not suffice, it may be decided to pre-empt another instance to which resource are allocated, in order to free resources (Continued)

sufficient for the instance having the small margin. Accordingly, scheduling is performed for instances having various classes without violating the SLOs of the instances and such that resources are more efficiently used.

20 Claims, 3 Drawing Sheets

(52) U.S. Cl.
CPC .......... *G06F 9/5038* (2013.01); *G06F 9/5072* (2013.01); *H04L 67/1002* (2013.01); *G06F 2009/4557* (2013.01); *G06F 2009/45595* (2013.01)

(58) Field of Classification Search
CPC ........ G06F 9/50; G06F 9/5005; G06F 9/5027; G06F 9/5038; G06F 9/5072; G06F 9/5077; G06F 2009/4557; G06F 2009/45575; G06F 2009/45595
See application file for complete search history.

(56) References Cited

U.S. PATENT DOCUMENTS

| | | | | |
|---|---|---|---|---|
| 9,436,258 | B1* | 9/2016 | Lo | G06F 9/4893 |
| 2007/0110094 | A1* | 5/2007 | Tobita | G06F 9/5038 |
| | | | | 370/453 |
| 2016/0300493 | A1 | 10/2016 | Ubhi et al. | |
| 2019/0087259 | A1* | 3/2019 | Saxena | G06F 9/45558 |

OTHER PUBLICATIONS

Garg, Saurabh Kumar, et al. "SLA-based virtual machine management for heterogeneous workloads in a cloud datacenter." Journal of Network and Computer Applications 45 (2014): 108-120. (Year: 2014).*

Li, Jiayin, et al. "Online optimization for scheduling preemptable tasks on IaaS cloud systems." Journal of Parallel and Distributed Computing 72.5 (2012): 666-677. (Year: 2012).*

Sukwong, Orathai, Akkarit Sangpetch, and Hyong S. Kim. "SageShift: managing SLAs for highly consolidated cloud." 2012 Proceedings IEEE INFOCOM. IEEE, 2012. (Year: 2012).*

Da Silva, Giovanni Farias, et al. "QoS-driven scheduling in the cloud." Journal of Internet Services and Applications 11.1 (2020): 1-36. (Year: 2020).*

Hsu, Willy Y-W., et al. "Profit-Driven Service-Chain Deployment For EDA Requests On Private Cloud." 2020 IEEE 9th International Conference on Cloud Networking (CloudNet). IEEE, 2020. (Year: 2020).*

Lodde, Andreas, et al. "SLA-driven resource provisioning in the cloud." 2011 First International Symposium on Network Cloud Computing and Applications. IEEE, 2011. (Year: 2011).*

International Search Report and Written Opinion for Application No. PCT/SE2017/050375, dated Jan. 3, 2018, 12 pages.

Carvalho, M. et al, "Prediction-Based Admission Control for IaaS Clouds with Multiple Service Classes," CLOUDCOM '15 Proceedings of the 2015 IEEE 7th International Conference on Cloud Computing Technology and Science (CloudCom), Nov. 30-Dec. 3, 2015, pp. 82-90.

Karanasos, K. et al., "Mercury: Hybrid Centralized and Distributed Scheduling in Large Shared Clusters," Proceedings of the 2015 USENIX Annual Technical Conference (USENIC ATC '15), Santa Clara, CA, Jul. 8-10, 2015, pp. 485-497, retrieved from Internet: Retrieved from the Internet: https://www.usenix.org/system/files/conference/atc15/atc15-paper-karanasos.pdf.

Mateescu, G. et al., "Hybrid Computing-Where HPC meets Grid and Cloud Computing," Future Generation Computer Systems, vol. 27, Jan. 1, 2011, pp. 440-453.

Shahrad, M. et al., "Availability Knob: Flexible User-Defined Availability in the Cloud," SoCC '16 Proceedings of the Seventh ACM Symposium on Cloud Computing, Santa Clara, CA, USA, Oct. 5-7, 2016, pp. 42-56.

Verma, A. et al., "Large-scale cluster management at Google with Borg," 2014 Ottawa Linux Symposium (OLS '14), Jan. 1, 2015, pp. 1-17.

International Preliminary Report on Patentability, PCT App. No. PCT/SE2017/050375, Oct. 24, 2019, 11 pages.

* cited by examiner

METHOD AND RESOURCE MANAGER FOR SCHEDULING OF INSTANCES IN A DATA CENTRE

CROSS-REFERENCE TO RELATED APPLICATIONS

This application is a National stage of International Application No. PCT/SE2017/050375, filed Apr. 13, 2017, which is hereby incorporated by reference.

TECHNICAL FIELD

This disclosure relates to scheduling of instances. More particularly, it relates to a method, a resource manager and a computer program for scheduling of instances in a data centre.

BACKGROUND

Infrastructure-as-a-Service (IaaS) is a cloud computing model that enables users to access computation resources when these are needed. The computation resources are typically bundled as virtual machines (VMs). Users then pay for what they use, instead of acquiring and maintaining their own hardware. A large variety of users, having different budgets and Quality of Service (QoS) requirements for applications, is migrating to this model.

Considering now an IaaS cloud provider that owns a set of physical computation machines. Each computation machine has a certain capacity for each type of resource, such as central processing unit (CPU), memory and disk. The nominal cloud capacity is the total amount of resources aggregated over all computation machines owned by the provider. The available cloud capacity accounts only for computation machines that are available to users, and may vary over time, for instance due to computation machine failure.

The resources can be offered as combinations of capacities to be allocated for each resource type, for instance 2 CPU-cores, 8 GB memory, and 32 GB disk space, and can be bundled as VMs.

Carvalho, M., et al., proposes in "Prediction-based admission control for IaaS clouds with multiple service classes" that a provider offers multiple classes, with potentially different pricing and expected QoS. Each class has a separate service level agreement (SLA), which is a contract that defines service level objectives (SLOs) that the provider promises to meet, and penalties that the provider pays in case an SLO is violated, that is, the promise is not fulfilled.

Further, in "Availability Knob: Flexible user-defined availability in the cloud" Proc. SoCC '16 Proceedings of the Seventh ACM Symposium on Cloud Computing October 2016, Hahrad, M. and Wentlaff, D. proposes a cloud model on which customers can express diverse availability SLOs to a cloud provider. It is further proposed techniques for scheduling based on machine failure probabilities, in order to meet availability SLOs and reduce provider's costs. A scheduler can migrate VMs to cheaper computation machines if their downtime fulfilment is not compromised. Deliberate downtimes can also be performed, pausing VMs that are above the downtime target by a safety margin. Extra capacity that is gained in this way can be offered for new computational resources.

Having introduced multiple classes for instances, where each class has a certain SLO requirement, it has not been described how to schedule instances efficiently without violating SLO fulfilment. This risks creating a high variance in SLO fulfilments. An average availability, being an example of a SLO, can be above its SLO requirement, with some resources fulfilling their SLO requirements and other resources fulfilling their SLO requirements too well. The capabilities are thus not used cost-efficiently, which can also reduce a SLO for other classes.

There is thus a demand for an improved solution circumventing or at least diminishing issues when scheduling instances belonging to different classes.

SUMMARY

It is an object of exemplary embodiments herein to address at least some of the issues outlined above and to schedule instances in logical servers. This object and others are achieved by a resource manager that is capable of scheduling instances, a method and a computer program therefore, according to the appended independent claims, and by the exemplary embodiments according to the dependent claims.

According to an aspect, the exemplary embodiments provide a method for scheduling instances to be run in two or more logical servers of a data centre, where each instance belongs to a class of instances, where each class of instances is associated with a required service level objective. The method comprises receiving from the two or more logical servers of the data centre, current information about a SLO of the instances assigned to the two or more logical servers. The method comprises determining a margin between current information about said service level objective and the respective required service level objective of the instances assigned to the two or more logical servers. The method also comprises identifying one of said two or more logical servers, based on the determined margin between current information about said service level objective and the respective required service level objective. The method further comprises sorting the instances according to their determined margin, for at least one class of instances, among the instances assigned to said identified logical server. The method further comprises sending to the identified logical server an instruction to pre-empt the instance that has a margin that is larger than any other margin of the sorted instances. The method also comprises, among the sorted instances, determining for said at least one class of instances, the instance that has a margin that is smaller than any other margin of the sorted instances. Also, the method comprises determining whether resources available in the logical server are sufficient for the instance that has the margin that is smaller than any other margin of the sorted instances. In addition, the method comprises, when the resources available in the logical server are sufficient, sending to the logical server an instruction to allocate resources in the logical server for scheduling said instance that has the smallest margin. In addition, the method comprises when the resources available in the logical server are not sufficient for the instance that has the smallest margin, reiterating previous actions of sending an instruction to pre-empt the instance that has a margin that is larger than any other margin of the sorted instances, determining for said at least one class of instances, the instance that has a margin that is smaller than any other margin of the sorted instances, and determining whether resources available in the logical server are sufficient for the instance that has the margin that is smaller than any other margin of the sorted instances for enabling sending an instruction to allocate resources in the logical server for scheduling of the instance that has the smallest margin.

According to another aspect, the exemplary embodiments provide a resource manager that is capable of scheduling instances to be run in two or more logical servers of a data centre related to the resource manager. Each instance belongs to a class of instances, where each class of instances is associated with a required SLO. The resource manager is adapted to receive from the two or more logical servers of the data centre, current information about a SLO of the instances assigned to the two or more logical servers. The resource manager is adapted to determine a margin between current information about said SLO and the respective required SLO of the instances assigned to the two or more logical servers. The resource manager is adapted to identify one of said two or more logical servers, based on the determined margin between current information about said SLO and the respective required SLO. The resource manager is also adapted to sort the instances according to their determined margin, for at least one class of instances, among the instances assigned to said identified logical server, and to send to the identified logical server an instruction to pre-empt the instance that has a margin that is larger than any other margin of the sorted instances. The resource manager is also adapted to, among the sorted instances, determine for said at least one class of instances, the instance that has a margin that is smaller than any other margin of the sorted instances. The resource manager is further also adapted to determine whether resources available in the logical server are sufficient for the instance that has the margin that is smaller than any other margin of the sorted instances. In addition, the resource manager is adapted, when the resources available in the logical server are sufficient, to send to the logical server an instruction to allocate resources in the logical server for scheduling said instance that has the smallest margin. The resource manager is adapted, when the resources available in the logical server are not sufficient for the instance that has the smallest margin, to be adapted to send to the logical server an instruction to pre-empt, to determine the instance having the smallest margin, and to whether available resources for the instance having the smallest margin are sufficient, in order to send an instruction to allocate resources in the logical server for scheduling of the instance that has the smallest margin.

According to further aspects, the object is also achieved by a computer program and a computer program product comprising a computer-readable storage medium whereon the computer program is stored.

Examples and embodiments as described have one or more of the following advantages and preferable features:

It is advantageous that an overall SLO fulfilment is increased while keeping the SLO of more instances above their required SLO.

It is advantageous that resource capacity utilization is increased when adding more instances to one or more logical servers.

It is an advantage that required SLOs are met without increasing the capacity of the resources.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

The following disclosure enables pre-empting instances belonging to various classes of instances, based on service level objectives (SLOs).

One example of a SLO metric is the availability of the instance, defined as the percentage of time the instance was running, since its request submission until its release or pause.

When the method herein is performed, it is determined the current SLOs of instances belonging to a class. If the current SLO of a first instance is further away from the SLO requirement defied by the class of the first instance, than the difference between the current SLO and the SLO requirement of any other instance, belonging to any class, said first instance is pre-emptied. The first instance is placed in waiting queue, which waiting queue comprises instances, which have been pre-emptied and wait for resources to be allocated to them.

A difference between a current SLO and a SLO requirement irrespective of the class to which the instance belongs is thus determined. This difference is used when deciding which instance to allocate resources for, and which instance to pre-empt, while still fulfilling the SLO requirement for each instance.

Figure 1:
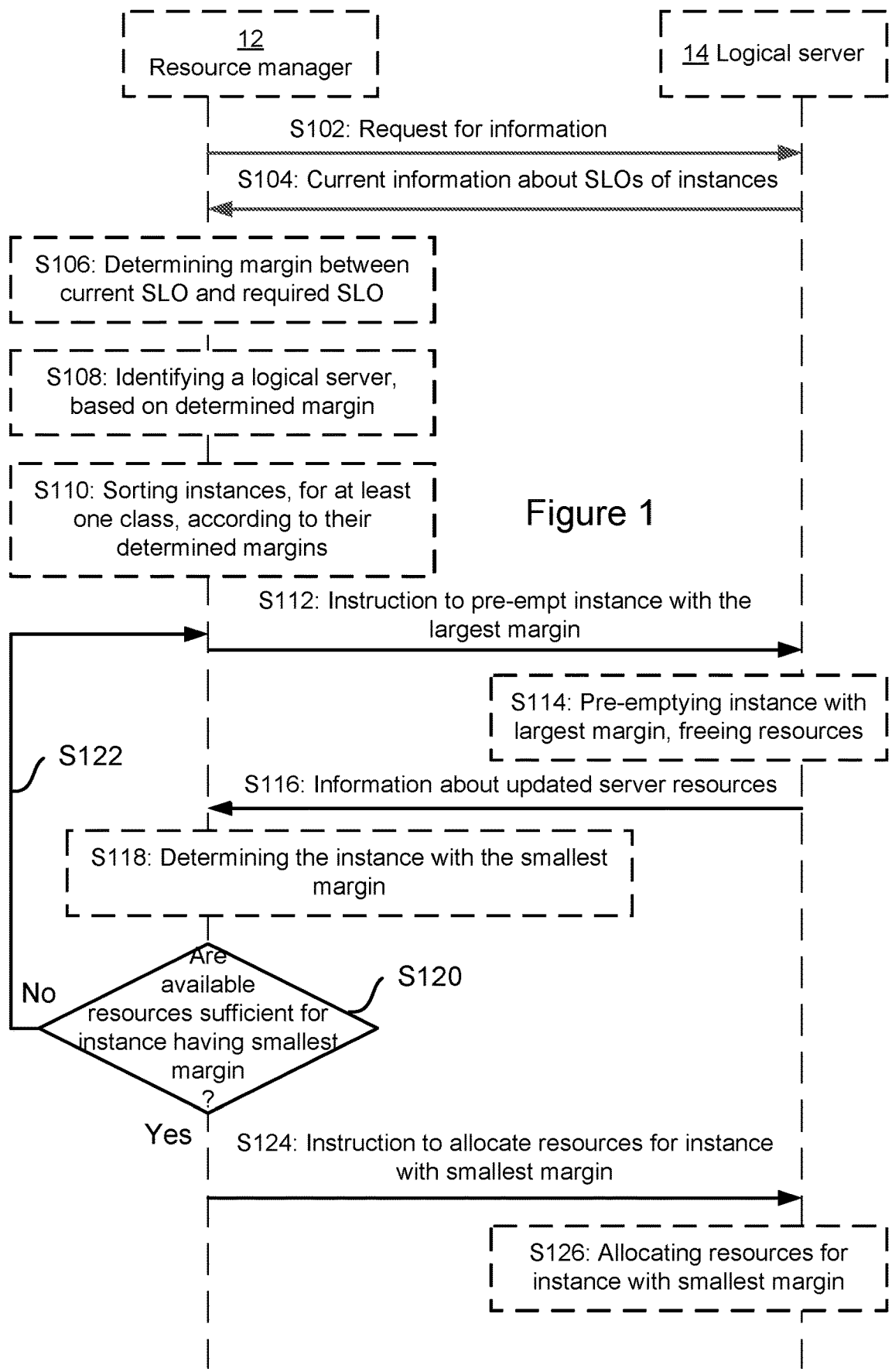
FIG. 1 schematically illustrates a handshake diagram between a resource manager and a logical server related to the embodiments of the present disclosure.

FIG. 1 schematically presents a handshake diagram between a resource manager 12 and a logical server 14 related to the embodiments of the present disclosure, for scheduling of instances in one or more logical servers of a data centre. Each instance belongs to a class of instances, where each class of instances is associated with a required service level objective, SLO.

A SLO of an instance may comprise any one of: availability of the instance, time run since the instance was last executed, time until the availability will be below a threshold, and use of processor cycles of the instance.

In action S102 of the handshake diagram, the resource manager 12 sends to the logical server 14 a request for current information about a SLO of the instances which are assigned to the logical server.

In action S104, the current information about the SLO of the instances is received by the resource manager 12, from the logical server 14.

In action S106, the resource manager 12 determines a difference in the form of a margin between current information of the SLO and the required SLO defined by the class of the instances assigned to two or more logical servers.

In action S108 the resource manager identifies a logical server of two or more logical servers based on the determined margins. Herein, it is determined which logical server of the two or more logical servers, which has more available resources, which available resources are preferably suitable for carrying out the instances.

In action S110 the resource manager sorts the instances, for at least one class, according to their determined respective margin. Sorting may alternatively be performed for two or more classes. Sorting of instances may thus result in a list of instances which have a relatively small margin in one end and a larger margin in another end, opposite to said one end. Instances within the list may thus have a margin that increases or decreases when moving along the list of instances.

In action S112, the resource manager sends an instruction to the logical server 14 to pre-empt the instance having the largest margin, between its current SLO and its required SLO.

In action S114, the logical server 14 pre-empts an instance that has a margin that is larger than any other margin of other instances. Resources which are occupied by the said pre-emptied instance are hence freed and made available to other instances.

In action S116, the logical server 14 may send updated information about available resources of the identified logical server.

In action S118, the resource manager 12 determines an instance that has a margin that is smaller than any other margin of any instances assigned to the logical server 14.

In action S120, the resource manager 12 determines whether the available resources of the logical server are sufficient for the instance having the smallest margin.

Action S122 is performed when it is determined that the available resources of the logical server are not sufficient of the instance having the smallest margin. This action includes reiterating actions S112-S120, such that the amount of available resources is increased. In the repeated action S112, the resource manager again sends an instruction to the logical server 14 to pre-empt an instance, for which resources are allocated by the logical server, and where said instance has a margin that is larger than any other margin of any instances of the logical server.

When it is determined in action S120 that the available resources in the logical server are sufficient for the instance that has a margin that is smaller than any other margin in the logical server, i.e. when inquiry in S120 is answered by "Yes", action S124 is performed.

In action S124 the resource manager 12 sends an instruction to the logical server to allocate resources for the instance that has a margin that is smaller than any other margin of any instance assigned to the logical server.

In action S126, the logical server allocates resources to the instance with the smallest margin, according to the instruction in action S124.

It is herein described that although instance may belong to various classes and thus have different required SLOs, it is disclosed how to schedule these instances in an efficient manner such that more instances will reach SLO fulfilment.

Whether to allocate or pre-empt an instance may hence be based on the margin between a current SLO and a required SLO of the respective instance, in relation to the margin of other instances assigned to the logical server.

Figure 2:
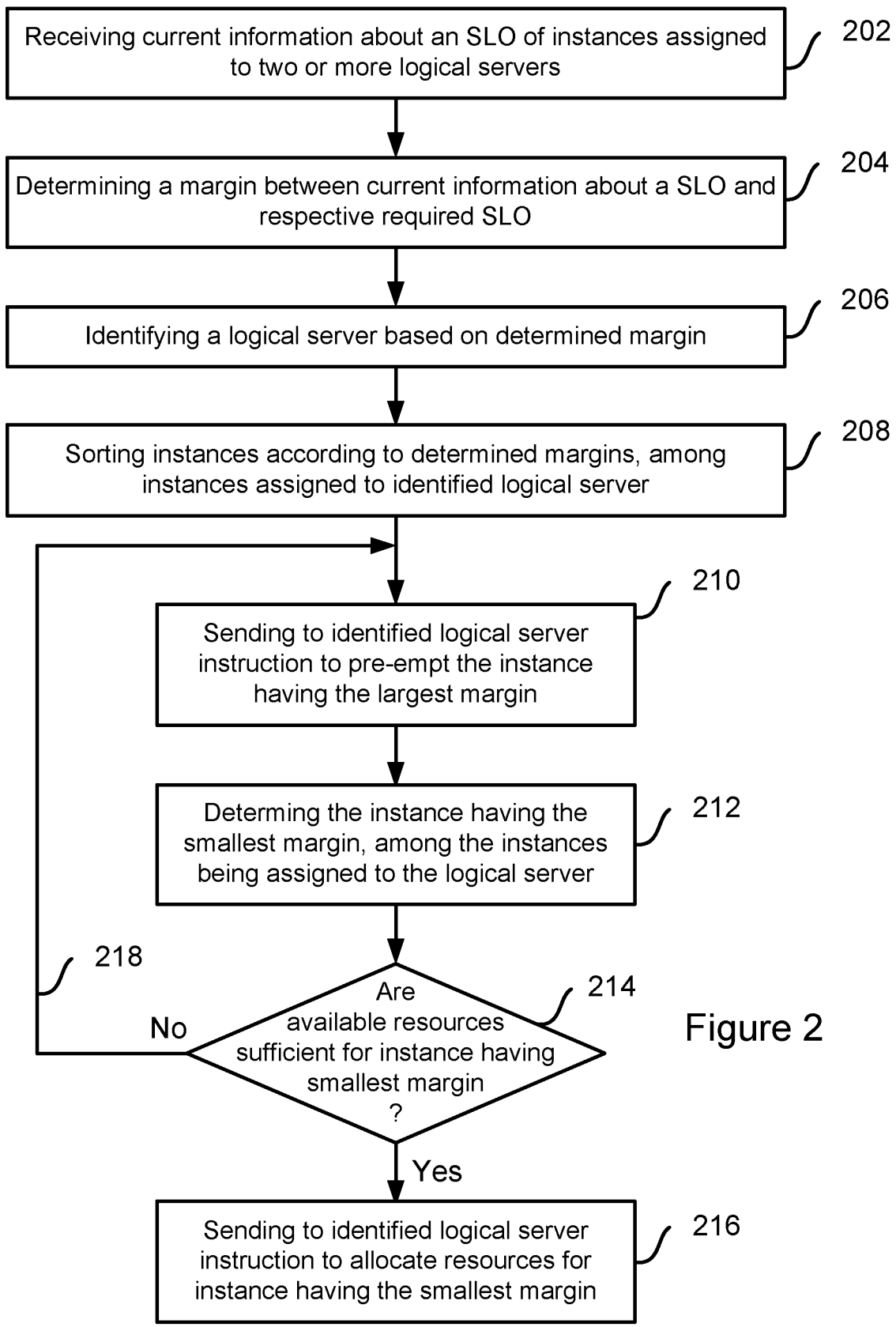
FIG. 2 schematically presents actions of a method for scheduling instances to be run in two or more logical servers, according to embodiments of the present disclosure.

FIG. 2 presents actions of a method for scheduling instances to be run in two or more logical servers of a data centre, according to embodiments of the present disclosure. Each instance belongs to a class of instances, where each class of instances is associated with a required SLO. It is hence illustrated in FIG. 2:

Action 202: Receiving from the two or more logical servers of the data centre, current information about a SLO of the instances assigned to the two or more logical servers.

Action 204: Determining a margin between current information about said SLO and the respective required SLO of the instances assigned to the two or more logical servers. The required SLO may further comprise a safety offset SLO, whereby the margin between the current information and the required SLO, will become smaller by a safety offset. As will be described down below, an instance with a smaller margin will be given a higher priority risk of violation of the respective minimum SLO is decreased.

The SLO of an instance may comprise a time duration lapsed since last time resources were allocated for said instance or since last time the instance was executed in the logical server.

The SLO of an instance may comprise an availability of the instance. The availability may be defined as the time total time during which the instance has been running divided by the difference between the time at which the instance stopped and the time the instance started. Alternatively, the availability may be defined as the total time during which the instance has been running divided by the current time, if presently running, minus the time at which the instance was submitted to the resource manager for execution.

The SLO of an instance may also comprise the use of processor cycles.

Action 206: Identifying one of said two or more logical servers, based on the determined margin between current information about said SLO and the respective required SLO.

Action 208: Sorting the instances according to their determined margin, for at least one class of instances, among the instances assigned to the identified logical server. Sorting may also comprise sorting of instances that belong to a superior class and an inferior class of instances, Action 210: Sending to the identified logical server an instruction to pre-empt the instance that has a margin that is larger than any other margin of the sorted instances. Sending 210 the instruction to pre-empt the instance may comprise sending an instruction to pre-empt an instance for which the logical server has allocated resources. Sending 210 the instruction to pre-empt the instance that has a margin that is larger than any other margin of the sorted instances may further comprise placing said instance in a queue of instance requests waiting for resource allocation.

The SLO of an instance may alternatively comprise a time duration, at the end of which a pre-emptied instance will not meet its required SLO.

Sending 210 the instruction may further comprise sending an instruction to pre-empt an instance belonging to the superior class, when the instance that has a margin that is larger than any other margin of the sorted instances belongs to the superior class.

Action 212: Among the sorted instances, determining for said at least one class of instances, the instance that has a margin that is smaller than any other margin of the sorted instances.

Action 214: Determining whether resources available in the logical server are sufficient for the instance that has the margin that is smaller than any other margin of the sorted instances.

The resources available in the identified logical server typically comprise resources other than resources already allocated to instances in the identified logical server.

Also, Action 216: Sending to the logical server an instruction to allocate resources in the logical server for scheduling said instance that has the smallest margin, when the resources available in the logical server are sufficient.

Alternatively, action 218: Reiterating previous actions of sending 210, determining 212, and determining 214 for enabling sending 216 an instruction to allocate resources in the logical server for scheduling of the instance that has the smallest margin, when the resources available in the logical server are not sufficient for the instance that has the smallest margin.

Each class defines the required, as described above. However, more than one SLO may be relevant for the class, for which reason each class may have a separate required SLO value for each SLO, or SLO type. One example of a SLO type is the total time an instance has been running, and another SLO type is the availability. These do not have to be totally independent of, or orthogonal to, each other.

Action 204 may thus comprise determining a margin for each SLO type. Action 208 may then comprise sorting according to primarily a first SLO type and secondarily a second SLO type. That is, if two instances are calculated to have one and the same first margin for a first SLO, the second margin can be considered and sorting among said two instances can be performed according to said second margin. For this reason, the determination of which instance to pre-empt and which instance to allocate resources for in the logical server may be based on two types of SLOs, in needed. The user may for this purpose specify a priority order, defining which SLO type to be primarily sorted according to, and which SLO type to be secondarily sorted according to.

The actions of the method may be triggered by any one of: a receipt of a request for scheduling of an instance belonging to a class of instances, a receipt of information that an instance assigned to one of said two or more logical servers is released, i.e. stopped running, a periodical trigger, or that at least a required SLO of a pre-empted instance is about to be violated.

The method may also comprise sending to the two or more logical servers of the data centre, a request for current information about a SLO of instances assigned to the two or more logical servers, prior to receiving from the two or more logical servers of the data centre, current information about the SLO of the instances assigned to the two or more logical servers.

Within these actions of the method, the instances may comprise one or more of: virtual machines, VMs, containers, and processes to be executed in a logical server.

The method may also be triggered when a current SLO of an instance placed in a waiting queue passes a further SLO level, for instance a factor, for example 1,5, multiplied by the required SLO.

Instances being assigned to logical server may thus be sorted according to their margin calculated as the difference between a current SLO and a required SLO.

For instance, if the SLO comprises time since last run, a margin may be calculated as the maximum time since last run minus the time since the last actual run. Instances can then be sorted according to this margin. An instance having a margin that is larger than any other margin of any instances assigned to the logical server, may thus be selected for pre-emption. Similarly, an instance having a margin that is smaller than any other margin of any instances assigned to the logical server, may thus be allocated resources, in order to minimize the risk of violating the SLO, i.e. having the current SLO passing the required SLO.

If the SLO comprises the use of processor cycles, a required SLO may comprise a required number of processor cycles per time unit. A margin may then be calculated as the actual number of processor cycles used minus the required number of processor cycles per time unit. Instances may then be sorted according to this calculated margin.

Alternatively, if the SLO of an instance comprise a time duration at the end of which the SLO is not fulfilled, a required SLO typically comprises a certain time duration, and a current SLO a shorter time duration, for which reason a margin may be calculated as the required time duration minus the shorter time duration, thus revealing a margin being the difference between the time durations. An instance having a margin that is larger, or longer, than any other margin of other instances assigned to the logical server, may be selected for pre-emption.

The SLO of an instance may also be the availability, as defined as the total time the instance has been running, or allocated resources, divided by the time length from the instance was submitted to the resource manager until the time it was released or stopped. If a required availability is 80% and a current availability is 90%, the availability margin is thus 10%. This percentage may then be compared with the corresponding margin for other instances, and sorted according to their respective margin. The instance having the largest margin may then be selected for pre-emption. Resources made available in this way may then be used for a different instance having a small, or even no, margin for avoiding violation of the SLO of this particular instance.

An example will now be described in which a logical server is capable of handling instances of three difference classes. It is herein assumed that instances belonging to these different classes have the same resource requirements. Instances belonging to various classes may well require different amounts of resources, but in this example, it is assumed that the requirements are equal. The logical server has a capacity to execute 4 instances at the same time.

TABLE 1

Instance classes and their required availability

| Class | Required availability |
|---|---|
| Production | 100% |
| Batch | 80% |
| Best-effort | 50% |

Further it is herein also assumed that the logical server has been running for a while, let us say time=10. It is now time 10.

TABLE 2

Instances with their classes and their running time and time when submitted time

| Instance | Class | Total time which the instance has been running | Time when submitted to resource manager |
|---|---|---|---|
| Production 1 | Production | 10 | 0 |
| Batch 1 | Batch | 10 | 0 |
| Batch 2 | Batch | 9 | 0 |
| Best-effort 1 | Best-effort | 5 | 0 |

From Table 2 the current availability can be calculated for each respective instance.

For production 1 instance: total running time/(current time−time when submitted)=10/(10-0)=1, i.e. 100%.

For instance Batch 1: 10/(10−0)=100%

For instance Batch 2: 9/(10−0)=0.9 =90% For instance Best-effort 1: 5/(10−0)=0.5 =50%

If the resource manager then receives a request for 2 further instances belonging to the Batch class. Since this event is one example of the triggering events the method is executed. Since the logical server only has resources sufficient for 4 instances, the method is performed.

For each instance a margin is calculated as the required availability minus the current availability.

Margin for instance production: 100%−100%=0%
Margin for instance Batch 1: 100%−80%=20%
Margin for instance Batch 2: 90%−80%=10%
Margin for instance Best-effort 1: 50%−50%=0%

These instances are sorted according to their margins. The instance having the largest margin is Batch 1. Thus Batch 1 is pre-emptied at time 10.

TABLE 3

Instances being allocated resources by the logical server at time 10, with the first (Batch 3) of the two instances belonging to Batch class.

| Instance | Class | Total time which the instance has been running | Time when submitted to resource manager |
| --- | --- | --- | --- |
| Production 1 | Production | 10 | 0 |
| Batch 2 | Batch | 9 | 0 |
| Batch 3 | Batch | 0 | 10 |
| Best-effort 1 | Best-effort | 5 | 0 |

TABLE 4

Waiting queue of instances being pre-emptied and waiting for resources to be allocated to the instance.

| Instance | Class | Total time which the instance has been running | Time when submitted to resource manager |
| --- | --- | --- | --- |
| Batch 1 | Batch | 10 | 0 |

In order to determine how to schedule instances to enable Batch 4, being the second of the two new instances, to be allocated resources. For each instance a margin is again calculated as the required availability minus the current availability.

Margin for instance production: 100%−100%=0%
Margin for instance Batch 2: 90%−80%=10%
Margin for instance Best-effort 1: 50%−50%=0%

Thus the instance with a margin that is larger than any other margin of any instance assigned to the logical server, is thus Batch 2, having a margin of 10%. Batch 2 is then pre-emptied and Batch 4 being allocated resources.

Instances being allocated resources by the logical server at time 10, with the first (Batch 3) of the two instances belonging to Batch class.

TABLE 5

Instances being allocated resources by the logical server at time 10, with Batch 3 and Batch 4 corresponding to the first and second new instances to which resources are being allocated.

| Instance | Class | Total time which the instance has been running | Time when submitted to resource manager |
| --- | --- | --- | --- |
| Production 1 | Production | 10 | 0 |
| Batch 3 | Batch | 0 | 10 |

TABLE 5-continued

Instances being allocated resources by the logical server at time 10, with Batch 3 and Batch 4 corresponding to the first and second new instances to which resources are being allocated.

| Instance | Class | Total time which the instance has been running | Time when submitted to resource manager |
| --- | --- | --- | --- |
| Batch 4 | Batch | 0 | 10 |
| Best-effort 1 | Best-effort | 5 | 0 |

TABLE 6

Waiting queue of instances being pre-emptied and waiting for resources to be allocated to the instance at time t = 10.

| Instance | Class | Total time which the instance has been running | Time when submitted to resource manager |
| --- | --- | --- | --- |
| Batch 1 | Batch | 10 | 0 |
| Batch 2 | Batch | 9 | 0 |

Thus, the resource manager has now instances Production 1, Batch 3, Batch 4 and Best-effort 1 as the 4 instances to which resources are allocated. Batch 1 and Batch 2 are pre-emptied, but they are still assigned to the logical server.

Moreover, the present disclosure also comprises computer program that is configured, when run on a computer, to perform the actions of the method for scheduling instances to be run in one or more logical servers of a data centre, as described above.

Also, the present disclosure comprises a computer program product that comprises a computer-readable storage medium and the computer program, as above, wherein the computer program is stored on the computer readable storage medium.

Figure 3:
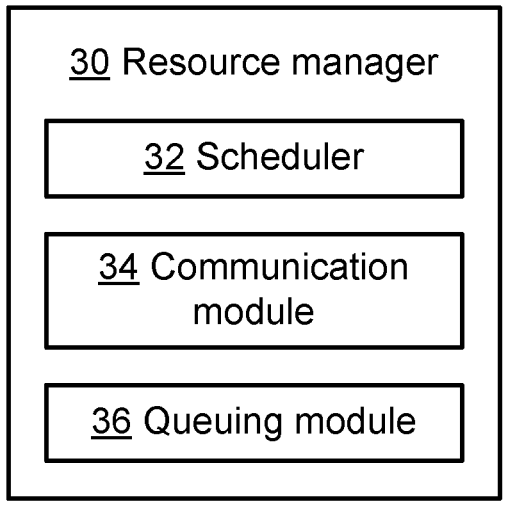
FIG. 3 schematically presents a resource manager, according to embodiments of the present disclosure.

FIG. 3 schematically presents a resource manager, according to embodiments of the present disclosure. The resource manager is capable of scheduling instances to be run in two or more logical servers of a data centre related to the resource manager. Each instance belongs to a class of instances, where each class of instances is associated with a required SLO. The resource manager comprises a scheduler 32, and a communication module 34 that is connected to the scheduler 32. The communication module is adapted to receive, from the two or more logical servers of the data centre, current information about said SLO of the instances assigned to the two or more logical servers. The scheduler 32 is adapted to determine a margin between the current information about said SLO and the respective required SLO of the instances being assigned to the two or more logical servers. The scheduler 32 is also adapted to identify one of said two or more logical servers, based on the determined margin between current information about said SLO and the respective required SLO. In addition, the scheduler 32 is adapted to sort the instances according to their determined margin, for at least one class of instances, among the instances assigned to said identified logical server. Further, the communication module 34 is adapted to send to the identified logical server an instruction to pre-empt the instance that has a margin that is larger than any other margin of the sorted instances. The scheduler 32 is adapted to determine for said at least one class of instances, among the sorted instances, the instance that has a margin that is smaller than any other margin of the sorted instances, and to determine whether resources available in the logical server are sufficient for the instance that has the margin that is smaller than any other margin of the sorted instances. The communication module 34 is in addition also adapted to send to the logical server an instruction to allocate resources in the logical server for scheduling said instance that has a margin that is smaller than any other margin of the sorted instances, when the resources available in the logical server are sufficient.

When the resources available in the logical server are not sufficient, the communication module 34 is also adapted to send to the logical server an instruction to pre-empt an instance, and the scheduler 32 is then also adapted to determine for said at least one class of instances, the instance having the smallest margin in said at least one class, and to determine whether resources available in the logical server are sufficient for the instance having the smallest margin, to enable sending an instruction to allocate resources in the logical server for scheduling said instance having the smallest margin.

The resource manager 30 may also comprise queuing module 36 adapted to maintain pre-empted instances waiting to be allocated resources in the logical server.

Figure 4:
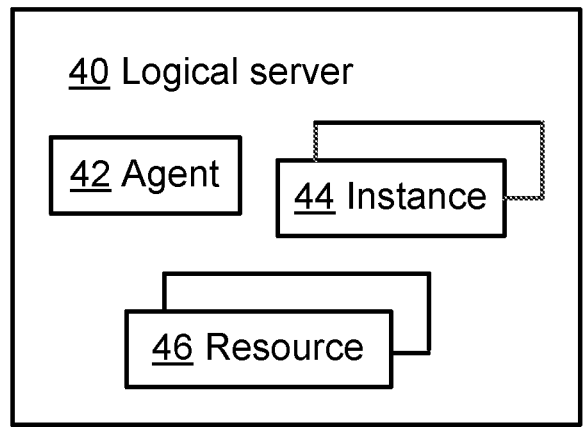
FIG. 4 schematically presents a logical server related to embodiments of the present disclosure.
Figure 5:
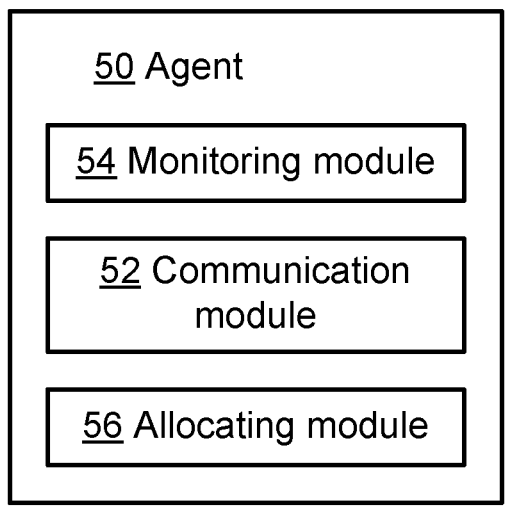
FIG. 5 schematically presents an agent related to embodiments of the present disclosure.

The present disclosure also comprises a system that is capable of scheduling instances. Reference is also made to FIGS. 4 and 5 schematically presenting a logical server and an agent related to embodiments of the present disclosure.

One example of a system comprises the resource manager 30 of FIG. 3, one or more logical servers 40, where each logical server comprises an agent 42, 50. The resource manager 30 can receive requests for scheduling of new instances, which instances are to be executed by said one or more logical servers 40. The resource manager 30 comprises a scheduler 32, a communication module 34 and may also comprise a queuing module 36.

Each logical server 40 comprises an agent 42, one or more instances 44 and resources 46.

The agent 50 comprises a monitoring module 54, a communication module 52 and an allocating module 56.

Each agent 50 communicates with the resource manager 30, and one or more processors, one or more memory resources and/or other types of resources 46 of the logical server 40. The resource manager 30 comprises a scheduler 32 that is adapted to execute the method as disclosed in this application, a queuing module 36 that is adapted to maintain instances that are pre-empted in a waiting queue, and a communication module 34 that is adapted to interact with the agents in the logical server 40.

The monitoring module 54 of the agent is adapted to monitor the available resources in the logical server 40. The allocating module 56 is adapted to allocate resources 46 in the logical server 40.

The instances typically run inside the logical server 40 and use their resources 46. A logical server 40 is typically a group of resources that can run instances. An example of a logical server is a physical server, whereas another example is a system composed of disaggregated hardware.

As earlier described each instance belongs to a class of instances. Each instance has further typically associated to it information about the time duration, that is a total time that, the instance has been running, the time of submission, that is the time at which the resource manager received a request for scheduling the instance in question. Also each instance has associated to it the amount of resources needed to execute the instance in question.

The agent is adapted to collect information about the logical server and to be able to provide required information to the resource manager. The agent therefore has information about the available resources in the logical server. These resources typically comprise the number of CPU being available, the amount of memory space, as well as the disk space. In addition, the agent keeps track of the number of instances allocated to the logical server.

Updated information about the available resources and the number of instances allocated to the logical server is thus communicated to the resource manager, such that scheduling can be adequately performed.

Although scheduling is controlled by the resource manager, hence managing the resources, the actual allocation of the resources may be performed by the allocating module 56 of the agent 50 within each logical server 40.

As described above each instance belongs to a class. Each class has various required SLOs. The actual required SLOs are decided by the user upon deciding which class each instance shall belong to. A user typically prefers a continuous production without any stand stills or interruptions, for which reason a production instance is placed in a class having a required SLO that guarantees the instance to be executed 100% of the time.

For another instance, for example a batch instance, it may be enough with a warranty guaranteeing the instance to be executed 80% of the time. It is thus the user deciding the class of the instance, and thereby also the usage of the resources of the logical server.

The present disclosure also comprises a resource manager that is capable of scheduling instances to be run in two or more logical servers of a data centre related to the resource manager. Each instance belongs to a class of instances, where each class of instances is associated with a required SLO. The resource manager is adapted to receive from the two or more logical servers of the data centre, current information about a SLO of the instances assigned to the two or more logical servers. The resource manager is adapted to determine a margin between current information about said SLO and the respective required SLO of the instances assigned to the two or more logical servers. The resource manager is adapted to identify one of said two or more logical servers, based on the determined margin between current information about said SLO and the respective required SLO. The resource manager is also adapted to sort the instances according to their determined margin, for at least one class of instances, among the instances assigned to said identified logical server, and to send to the identified logical server an instruction to pre-empt the instance that has a margin that is larger than any other margin of the sorted instances. The resource manager is also adapted to, among the sorted instances, determine for said at least one class of instances, the instance that has a margin that is smaller than any other margin of the sorted instances. The resource manager is further also adapted to determine whether resources available in the logical server are sufficient for the instance that has the margin that is smaller than any other margin of the sorted instances. In addition, the resource manager is adapted, when the resources available in the logical server are sufficient, to send to the logical server an instruction to allocate resources in the logical server for scheduling said instance that has the smallest margin. The resource manager is adapted, when the resources available in the logical server are not sufficient for the instance that has the smallest margin, to be adapted to send to the logical server an instruction to pre-empt, to determine the instance having the smallest margin, and to whether available resources for the instance having the smallest margin are sufficient, in order to send an instruction to allocate resources in the logical server for scheduling of the instance that has the smallest margin.

Examples and embodiments as described herein have one or more of the following advantages and preferable features:

It is advantageous that an overall SLO fulfilment is increased while keeping the SLO of more instances above their required SLO.

It is advantageous that resource capacity utilization is increased when adding more instances to one or more logical servers.

It is an advantage that required SLOs are met without the need to increase the capacity of the resources.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

CPU central processing unit
IaaS infrastructure-as-a-service
QoS quality of service
SLA service level agreement
SLO service level object
VM virtual machine

The invention claimed is:

1. A method for scheduling instances to be run in two or more logical servers of a data centre, where each instance belongs to a class of instances, where each class of instances is associated with a required service level objective (SLO) the method comprising:
receiving, from the two or more logical servers of the data centre, current information about a SLO of instances assigned to the two or more logical servers;
determining, for each instance of the instances assigned to the two or more logical servers, a margin between the current information about the SLO and the respective required SLO;
identifying one of said two or more logical servers based on the determined margins of the instances assigned to the two or more logical servers;
sorting, for at least one class of instances, the instances assigned to the identified logical server according to the determined margins;
sending, to the identified logical server, an instruction to pre-empt an instance that has a margin that is larger than any other margin of the sorted instances;
among the sorted instances, determining for the at least one class of instances, an instance that has a margin that is smaller than any other margin of the sorted instances;
determining whether resources available in the identified logical server are sufficient for the instance that has the margin that is smaller than any other margin of the sorted instances;
when the resources available in the identified logical server are sufficient for the instance that has the margin that is smaller than any other margin of the sorted instances:
sending, to the identified logical server, an instruction to allocate resources in the identified logical server for scheduling the instance that has the margin that is smaller than any other margin of the sorted instances; and
when the resources available in the identified logical server are not sufficient for the instance that has the margin that is smaller than any other margin of the sorted instances:
reiterating previous actions of the sending the instruction to pre-empt the instance that has a margin that is larger than any other margin of the sorted instances, the determining an instance that has a margin that is smaller than any other margin of the sorted instances, and the determining whether resources available in the identified logical server are sufficient for the instance that has the margin that is smaller than any other margin of the sorted instances to enable sending an instruction to allocate resources in the identified logical server for scheduling of the instance that has the margin that is smaller than any other margin of the sorted instances.

2. The method according to claim 1, wherein sending the instruction to pre-empt the instance that has a margin that is larger than any other margin of the sorted instances comprises sending the instruction to pre-empt an instance for which the identified logical server has allocated resources.

3. The method according to claim 1, wherein sending the instruction to pre-empt the instance that has a margin that is larger than any other margin of the sorted instances further comprises placing the instance that has a margin that is larger than any other margin of the sorted instances in a queue of instance requests waiting for resource allocation.

4. The method according to claim 1, wherein the resources available in the identified logical server comprise resources other than the resources which already have been allocated to instances in the identified logical server.

5. The method according to claim 1, wherein the sorting also comprises sorting instances belonging to a superior class and an inferior class of instances in addition to sorting according to the determined margins, and wherein sending the instruction to pre-empt an instance that has a margin that is larger than any other margin of the sorted instances further comprises sending the instruction to pre-empt an instance belonging to the superior class when the instance that has the margin that is larger than any other margin of the sorted instances belongs to the superior class.

6. The method according to claim 1, wherein the respective required SLO further comprises a safety offset SLO, whereby a risk of violation of the respective required SLO is decreased.

7. The method according to claim 1, wherein a SLO of an instance comprises a time duration since a last time resources were allocated for the instance.

8. The method according to claim 1, wherein a SLO of an instance comprises a time duration, at the end of which the instance will not fulfil the SLO.

9. The method according to claim 1, wherein a SLO of an instance comprises an availability of the instance.

10. The method according to claim 9, wherein the availability of the instance comprises a duration during which the instance has been running in the identified logical server divided by a difference between a current time, if the instance is still running, or a time at which the instance was released, and a time at which a request for scheduling thereof was received by a scheduler.

11. The method according to claim 1, wherein a SLO of an instance comprises use of processor cycles.

12. The method according to claim 1, where the method is triggered by any one of: receipt of a request for scheduling of an instance belonging to a class of instances, a receipt of information that an instance assigned to one of the two or more logical servers is released, a periodical trigger, or that at least a required SLO of a pre-empted instance is about to be violated.

13. The method according to claim 1, further comprising sending to the two or more logical servers of the data centre, a request for the current information about the SLO of the instances assigned to the two or more logical servers.

14. The method according to claim 1, where the instances comprise one or more of: virtual machines (VMs), containers, and processes.

15. A resource manager for scheduling instances to be run in two or more logical servers of a data centre associated with the resource manager, where each instance belongs to a class of instances, where each class of instances is associated with a required service level objective (SLO), the resource manager comprising:
  a processor, and
  a set of memory devices, wherein the set of memory device store instructions that when executed by the processor cause the resource manager to:
    receive, from the two or more logical servers of the data centre, current information about the SLO of instances assigned to the two or more logical servers;
    determine, for each instance of the instances assigned to the two or more logical servers, a margin between the current information about the SLO and the respective required SLO;
    identify one of the two or more logical servers based on the determined margins of the instances assigned to the two or more logical servers;
    sort, for at least one class of instances, the instances assigned to the identified logical server according the to the determined margins;
    send, to the identified logical server, an instruction to pre-empt an instance that has a margin that is larger than any other margin of the sorted instances;
    among the sorted instances, determine, for the at least one class of instances, the instance that has a margin that is smaller than any other margin of the sorted instances;
    determine whether resources available in the identified logical server are sufficient for the instance that has the margin that is smaller than any other margin of the sorted instances;
    when the resources available in the identified logical server are sufficient for the instance that has the margin that is smaller than any other margin of the sorted instances:
      send to the identified logical server an instruction to allocate resources in the identified logical server for scheduling the instance that has a margin that is smaller than any other margin of the sorted instances; and
    when the resources available in the identified logical server are not sufficient for the instance that has a margin that is smaller than any other margin of the sorted instances:
      reiterate previous actions of sending the instruction to pre-empt the instance that has a margin that is larger than any other margin of the sorted instances, the determining an instance that has a margin that is smaller than any other margin of the sorted instances, and the determining whether resources available in the identified logical server are sufficient for the instance that has the margin that is smaller than any other margin of the sorted instances to enable sending an instruction to allocate resources in the identified logical server for scheduling of the instance that has the margin that is smaller than any other margin of the sorted instances.

16. A non-transitory machine-readable storage medium that provides instructions that, if executed by a processor, will cause said processor to perform operations for scheduling instances to be run in two or more logical servers of a datacenter, where each instance belongs to a class of instances, where each class of instances is associated with a required service level objective (SLO), wherein the operations comprise:
  receiving, from the two or more logical servers of the datacenter, current information about a SLO of instances assigned to the two or more logical servers;
  determining, for each instance of the instances assigned to the two or more logical servers, a margin between the current information about the SLO and the respective required SLO;
  identifying one of the two or more logical servers based on the determined margins of the instances assigned to the two or more logical servers;
  sorting, for at least one class of instances, the instances assigned to the identified logical server according to the determined margin;
  sending, to the identified logical server, an instruction to pre-empt an instance that has a margin that is larger than any other margin of the sorted instances;
  among the sorted instances, determining for the at least one class of instances, an instance that has a margin that is smaller than any other margin of the sorted instances;
  determining whether resources available in the identified logical server are sufficient for the instance that has the margin that is smaller than any other margin of the sorted instances;
  when the resources available in the identifier logical server are sufficient for the instance that has the margin that is smaller than any other margin of the sorted instances:
    sending to the identified logical server an instruction to allocate resources in the identified logical server for scheduling the instance that has the margin that is smaller than any other margin of the sorted instances; and
  when the resources available in the identified logical server are not sufficient for the instance that has a margin that is smaller than any other margin of the sorted instances:
    reiterating previous actions of the sending the instruction to pre-empt the instance that has a margin that is larger than any other margin of the sorted instances, the determining an instance that has a margin that is smaller than any other margin of the sorted instances, and the determining whether resources available in the identified logical server are sufficient for the instance that has the margin that is smaller than any other margin of the sorted instances to enable sending an instruction to allocate resources in the identified logical server for scheduling of the instance that has the margin that is smaller than any other margin of the sorted instances.

17. The non-transitory machine-readable storage medium according to claim 16, wherein sending the instruction to pre-empt the instance that has a margin that is larger than any other margin of the sorted instances comprises sending the instruction to pre-empt an instance for which the identified logical server has allocated resources.

18. The non-transitory machine-readable storage medium according to claim 16, wherein sending the instruction to pre-empt the instance that has a margin that is larger than any other margin of the sorted instances further comprises placing the instance that has a margin that is larger than any other margin of the sorted instances in a queue of instance requests waiting for resource allocation.

19. The non-transitory machine-readable storage medium according to claim 16, wherein the resources available in the identified logical server comprise resources other than resources which already have been allocated to instances in the identified logical server.

20. The non-transitory machine-readable storage medium according to claim 16, wherein the sorting also comprises sorting instances belonging to a superior class and an inferior class of instances in addition to sorting according to the determined margins, and wherein sending the instruction to pre-empt an instance that has a margin that is larger than any other margin of the sorted instances further comprises sending the instruction to pre-empt an instance belonging to the superior class when the instance that has a margin that is larger than any other margin of the sorted instances belongs to the superior class.

\* \* \* \* \*